May 15, 1962  G. A. ARNOLD ETAL  3,034,597
FRICTION DAMPER
Filed Nov. 14, 1960
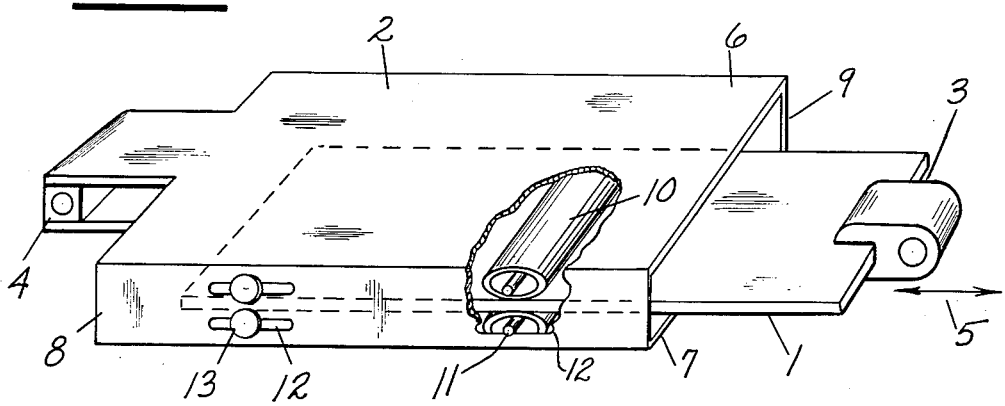
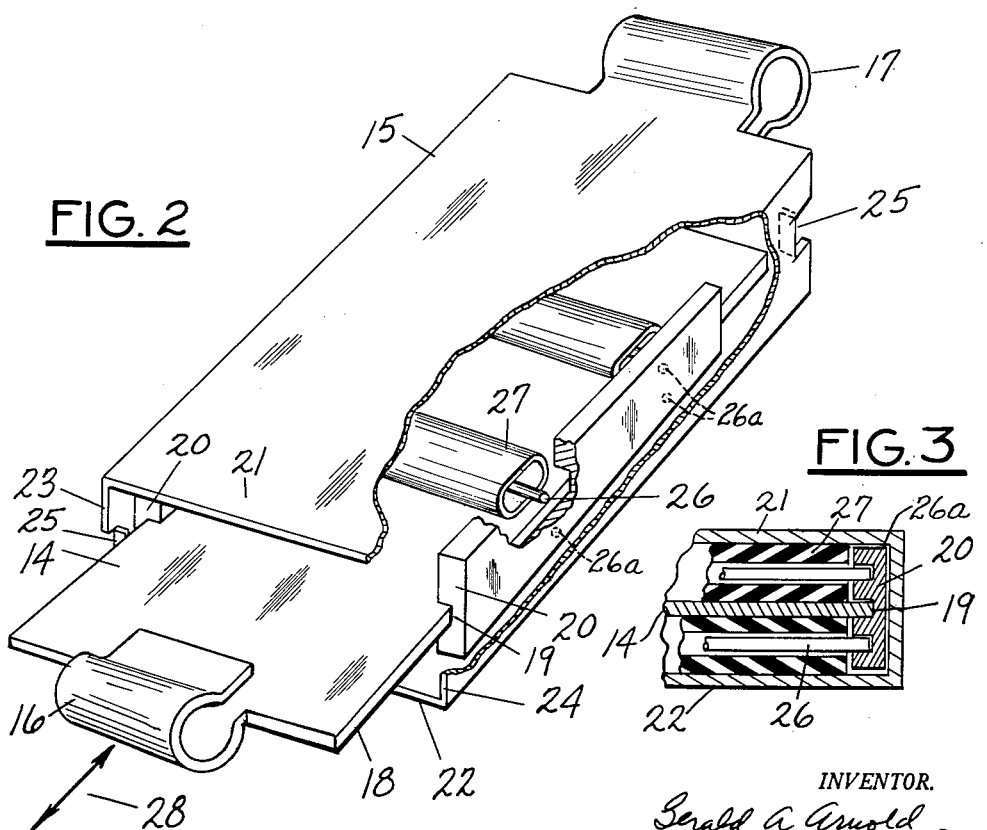
INVENTOR.
Gerald A. Arnold
BY Leon Wallerstein Jr.
Ralph Hammar
attorney

United States Patent Office 3,034,597
Patented May 15, 1962

3,034,597
FRICTION DAMPER
Gerald A. Arnold and Leon Wallerstein, Jr., Erie, Pa., assignors to Lord Manufacturing Company, Erie, Pa., a corporation of Pennsylvania
Filed Nov. 14, 1960, Ser. No. 68,774
4 Claims. (Cl. 188—1)

This invention is a damper offering frictional resistance to relative movement between parts. The frictional resistance is obtained from tubes of an elastomer having high internal friction or hysteresis which are squeezed between relatively movable surfaces. Upon relative movement of the surfaces, the tubes are rolled between the surfaces and energy is dissipated by the internal friction or hysteresis in the elastomer.

In this general type of damper it has been found that the tubes tend to creep out of position, interfering with the damping action. This prevented by rods loosely extending through the tubes and suitably guided on one of the relatively movable parts. Until creeping of the tubes appears, the rods remain centered within the tubes. Creeping brings the tubes into contact with the rods and compels repositioning of the tubes.

In the drawing, FIG. 1 is a perspective of a damper with parts broken away, FIG. 2 is a perspective of a modification with parts broken away, and FIG. 3 is a partial transverse section through the modification.

The damper comprises relatively movable parts 1 and 2 respectively provided with connectors 3 and 4 by which the damper is interposed between structures in which damping is to be introduced. For example, the connection 4 might be attached to a frame or base and the connection 3 might be attached to a body yieldably supported on the base so as to have an excursion in the the direction of arrow 5. The damper, when so connected, offers a resistance to the excursion due to internal friction or hysteresis in the elastomer.

The part 1 of the damper is in the form of a rectangular plate extending in the direction of the arrow 5. The part 2 is in the form of a housing having walls 6 and 7 spaced from and parallel to opposite faces of the plate 1 and having walls 8 and 9 spaced from and parallel to opposite edges of the plate. The spacing between the walls 6 and 7 and the adjacent faces of the plate 1 is less than the normal or unstressed diameter of tubes 10 of flexible elastomer having high internal damping or hysteresis. The tubes are accordingly flattened and, upon relative movement between the parts 1 and 2 in the direction of arrow 5, the tubes have a rolling action which introduces damping without elastic restraint. The absence of elastic restraint is due to the fact that as the tubes roll between the opposed surfaces, one half of each tube is being relieved of stress while the other half is being loaded.

Upon repeated relative movement of the parts 1 and 2 of the damper, it has been observed that the tubes 10 tend to creep out of their desired positions in which the axes of the tubes are crosswise of the member 1 and perpendicular to the arrow 5. This creeping interferes with the desired damping action. In order to prevent creeping, a rod 11 extends loosely through the center of each of the tubes 10 and through slots 12 in the end walls 8 and 9 of the member 2. The rods are held in the slots by heads 13 on opposite ends which overlap the outer surfaces of the slots. Under normal conditions, when the rods 11 are centered within the tubes 10, the rods have no effect upon the damping. If the tubes 10 creep out of position, so as to become tilted or unevenly spaced, the rods are forced aganist the ends of the slots and forcibly bring the tubes back into alignment. In the process of realigning the tubes, slippage occurs between the misaligned tubes and the surfaces of the damping members 1 and 2.

The length of the slots 12 is greater than the length of the stroke of the damper by the amount that the tubes 10 are permitted to move out of the desired parallel and evenly spaced relation. Whenever the misalignment exceeds the amount permitted by the slots 12, the rods 11 engage one end of the slots 12 during one cycle of each excursion and force the tubes back into the desired parallel relation.

In the modification shown in FIG. 2, the damper has parts 14 and 15 respectively provided with connectors 16 and 17 for connection to parts between which friction damping is to be introduced. The part 14 is a rectangular plate having opposite edges 18 slidably received in grooves 19 in guides 20. The part 15 is in the form of a housing having walls 21 and 22 spaced from and parallel to opposite faces of the plate 14 and walls 23 and 24 parallel to the edges of the plate on which the guides 20 slide. The sliding movement of the guides is limited by tabs 25 or other suitable stops at opposite ends of each of the walls 23 and 24. Crosswise extending rods 26 have opposite ends journaled in holes 26a in the guides 20 so that the rods are held in a parallel and evenly spaced relation. Each of the rods extends through a tube 27 of an elastomer having high internal damping. The diameter of the tube, as in the FIG. 1 damper, is greater than the space between the plate 14 and the adjacent walls 21, 22, as the case may be. The tubes are accordingly flattened and as the parts of the damper are reciprocated relative to each other in the direction of arrow 28, the rolling contact of the tubes with the adjacent surfaces of the damper causes successive deformation of the tubes and introduces the desired frictional restraint due to the internal friction of the tubes. Since the guides 20 maintain the rods 26 in the desired parallel and evenly spaced relation, the tubes 27 cannot creep out of position to an extent greater than the internal clearance between the rods and tubes. As soon as the clearance is taken up by creeping of the tubes, contact with the rods restrains further creeping and causes slippage, bringing the tubes back into proper alignment.

What is claimed as new is:

1. A damper comprising parts oscillatable relative to each other and having spaced opposed surfaces extending in the direction of relative movement between said parts, a tube of an elastomer having high internal damping between said opposed surfaces and extending crosswise to the direction of relative movement between said parts, said tube having a normal diameter greater than the spacing between said surfaces whereby the tube is flattened and upon relative movement between the surfaces the tube has a rolling action, a rod loosely extending through the center of the tube, and means for guiding the rod in one of said parts to maintain the rod crosswise to the direction of relative movement between said surfaces whereby the rod restrains creeping of the tube out of the desired crosswise position.

2. A damper comprising parts oscillatable relative to each other and having spaced opposed surfaces extending in the direction of relative movement between said parts, a tube of an elastomer having high internal damping between said opposed surfaces and extending crosswise to the direction of relative movement between said parts, said tube having a normal diameter greater than the spacing between said surfaces whereby the tube is flattened and upon relative movement between the surfaces the tube has a rolling action, a rod loosely extending through the center of the tube, and one of said parts having slots receiving opposite ends of said rod for maintaining the rod crosswise to the direction of relative movement between said surfaces whereby the rod restrains creeping of the tube out of the desired crosswise position.

3. A damper comprising parts oscillatable relative to each other and having spaced opposed surfaces extending in the direction of relative movement between said parts, a tube of an elastomer having high internal damping between said opposed surfaces and extending crosswise to the direction of relative movement between said parts, said tube having a normal diameter greater than the spacing between said surfaces whereby the tube is flattened and upon relative movement between the surfaces the tube has a rolling action, a rod loosely extending through the center of the tube, one of said parts having guide means at opposite ends of said rod extending in the direction of relative movement between said surfaces for maintaining the rod crosswise to the direction of relative movement between said surfaces whereby the rod restrains creeping of the tube out of the desired crosswise position.

4. A damper comprising inner and outer parts oscillatable relative to each other, the inner part comprising a plate, the outer part having surfaces presented to and spaced from opposite sides of the plate, tubes between opposite sides of the plate and the adjacent surfaces of the outer part, said tubes extending crosswise of the direction of relative movement between said parts and having a greater diameter than the spacing between said plate and said adjacent surfaces whereby the tubes are flattened and upon relative rolling movement the tubes have a rolling action, rods extending through the centers of the tubes, the outer part having guide ways at opposite ends of the rods extending in the direction of relative movement, guide means in said ways for maintaining the rods crosswise to the direction of relative movement and for maintaining the spacing between the plate and the adjacent surfaces of the outer part.

References Cited in the file of this patent

UNITED STATES PATENTS

| 2,819,060 | Neidhart | Jan. 7, 1958 |
| 2,819,063 | Neidhart | Jan. 7, 1958 |

FOREIGN PATENTS

| 1,109,578 | France | Sept. 28, 1955 |
| 1,130,530 | France | Oct. 1, 1956 |